Aug. 16, 1938.       H. W. FALK       2,127,023
MACHINE TOOL TRANSMISSION
Filed Aug. 17, 1936        3 Sheets-Sheet 1
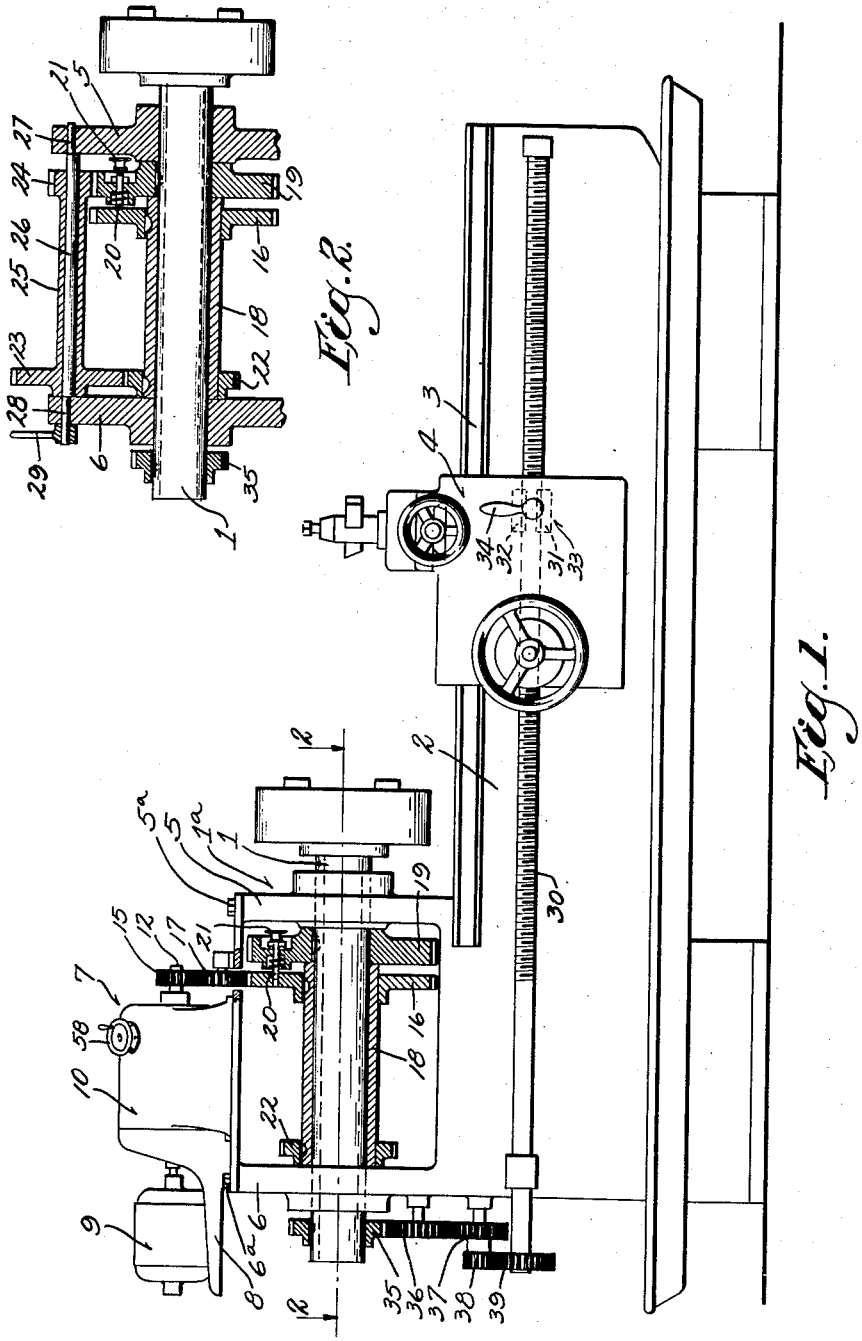
INVENTOR
Herman W. Falk
BY Fred A. Parsons
ATTORNEY

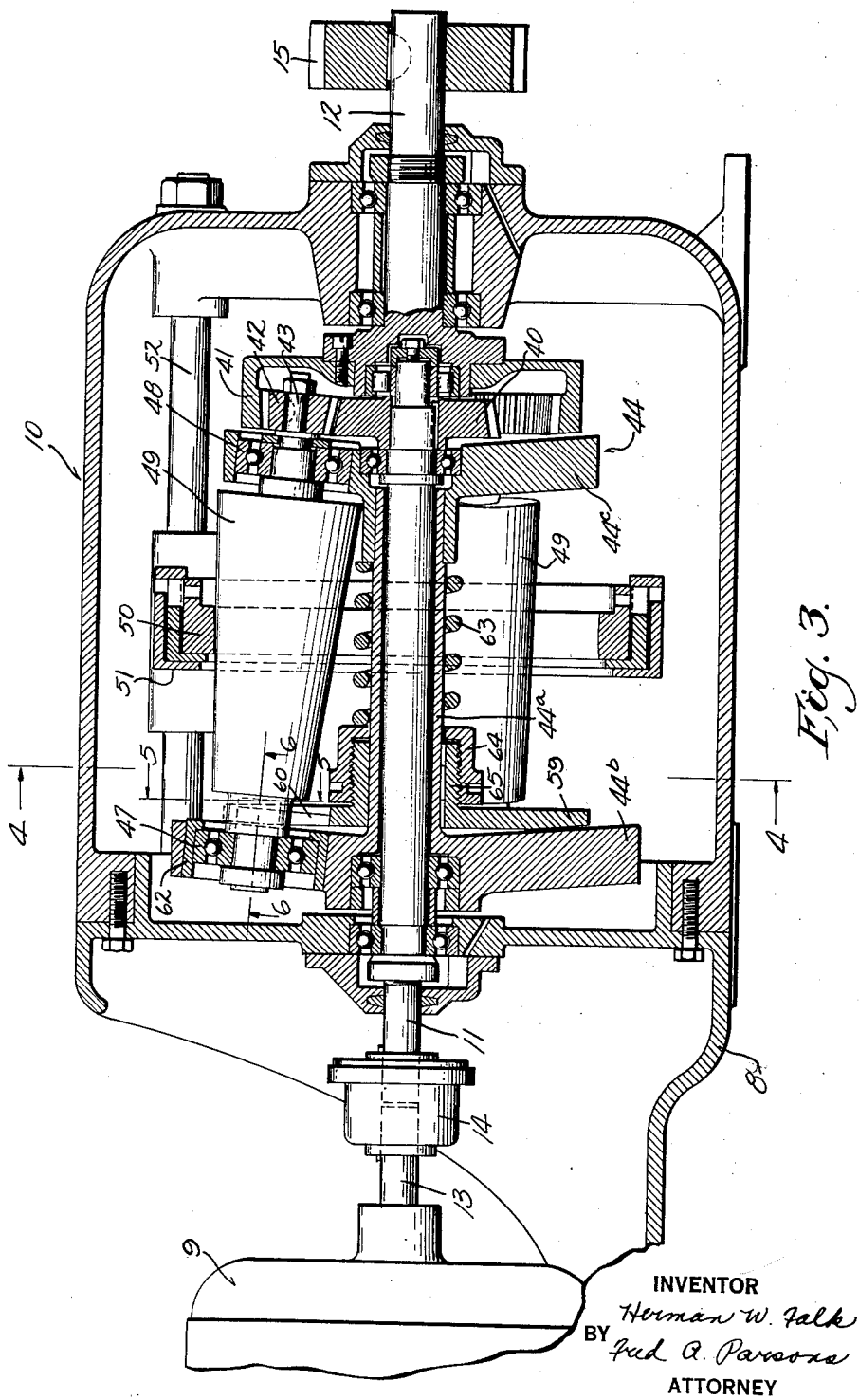

Aug. 16, 1938.    H. W. FALK    2,127,023
MACHINE TOOL TRANSMISSION
Filed Aug. 17, 1936    3 Sheets-Sheet 3
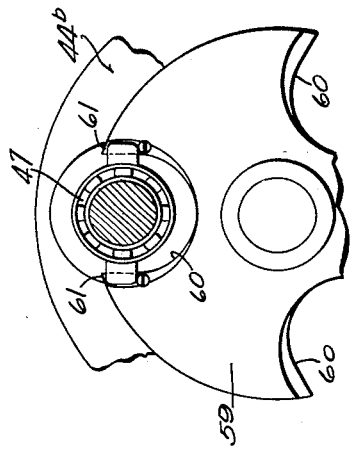
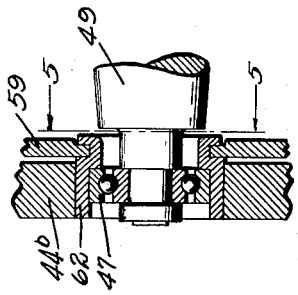
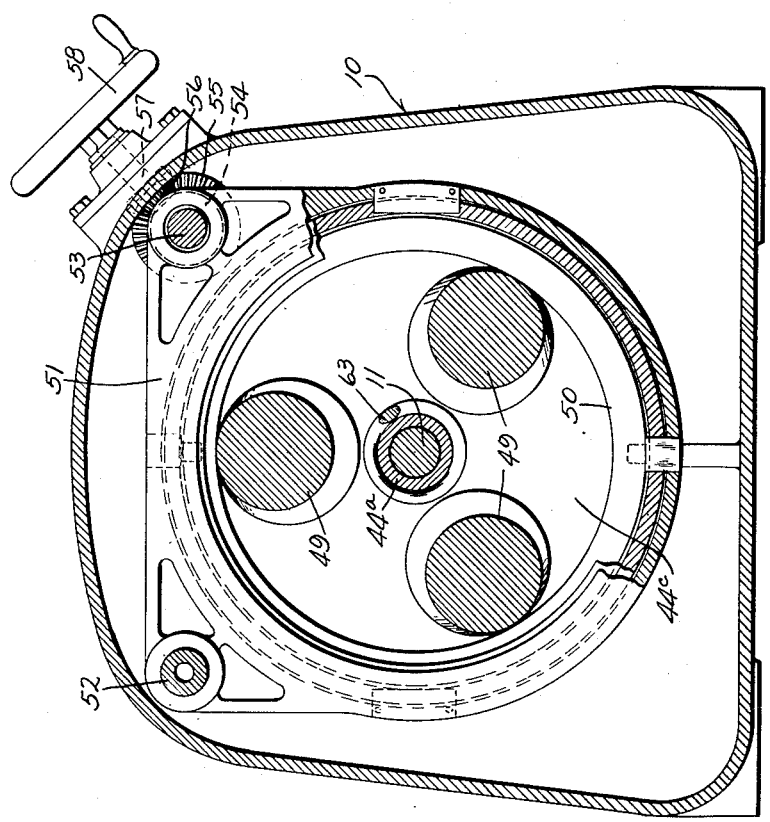
INVENTOR
Herman W. Falk
BY Fred A. Parsons
ATTORNEY Patented Aug. 16, 1938

2,127,023

UNITED STATES PATENT OFFICE 2,127,023

MACHINE TOOL TRANSMISSION

Herman W. Falk, Milwaukee, Wis., assignor to The Falk Corporation, Milwaukee, Wis., a corporation of Wisconsin Application August 17, 1936, Serial No. 96,355

6 Claims. (Cl. 82—29)

This invention relates to machine tools, and more particularly to transmission and control mechanism therefor.

A purpose of the invention is to provide an improved machine tool having a transmission and control mechanism capable of stepless speed variations within the speed range of the transmission and particularly for the spindle transmission of lathes.

A further purpose is to provide an improved machine tool having a transmission and control with which stepless speed variation is obtainable through different ranges of output speed respectively adapted for different torque requirements, and more particularly to effect such result by the means of a primary speed change device having a wide range of stepless speed changes together with supplemental speed change means alternatively connecting said device to operate to effect the different ranges.

A further purpose is to provide a machine tool having a transmission and control mechanism as above mentioned with improved control mechanism for effecting the stepless changes of speed, or the different ranges of stepless speed changes and particularly in a form, both as to the transmission and control mechanism, adapted for driving the work spindle of a lathe.

A further purpose is to provide a unitary device adapted to be readily applied to existing forms of machine tools, particularly to lathe spindles, to substitute a stepless speed variator for all or part of the machine tool transmission mechanism to effect one or more of the objects previously mentioned.

A further purpose is generally to simplify and improve the construction and operation of transmission and control mechanism for machine tools and particularly for the spindle of a lathe. Still other purposes will be apparent from this specification.

The invention consists of the construction and arrangement of parts as herein specifically illustrated, described and claimed, together with such modifications as may be equivalent to the structure claimed.

The same reference characters have been used to indicate the same parts throughout, and in the drawings:

Figure 1 is a front view of a lathe incorporating the invention.

Figure 2 is a partial horizontal section taken approximately along line 2—2 of Fig. 1.

Figure 3 is an enlarged partial vertical section through a primary rate change device shown at the upper left of Fig. 1.

Figure 4 is a vertical transverse section taken approximately along line 4—4 of Fig. 3.

Figure 5 is a partial vertical section taken approximately along line 5—5 of Fig. 3.

Figure 6 is a partial section taken along line 6—6 of Fig. 3.

The lathe structure shown in Fig. 1 includes a work spindle 1 suitably journaled in a headstock 1a fixed on a bed 2 providing ways 3 for the movement of a tool carriage 4 toward and from spindle 1, in a path parallel to the axis of the spindle.

Removably fixed on headstock 1a on suitable supporting brackets 5, 6, as by bolts 5a, 6a is a unit, generally denoted by the numeral 7, having a base or frame 8 unitarily supporting a driving motor 9 and a primary mechanical rate changer or speed variator generally denoted by the numeral 10, the variator 10 providing a driving shaft 11 and a driven shaft 12, driving shaft 11 being coupled with the shaft 13 of motor 9 through a coupling device 14 which may be of any suitable well known form, the variator being constructed to effect any speed of a wide range of speeds of output shaft 12 while maintaining a constant speed of drive shaft 11, as will be explained.

Fixed on the output shaft 12 of variator 10 is a pinion 15, which drives a gear 16 through an idler 17, gear 16 being fixed on a sleeve 18 rotatably supported on spindle 1 for rotation independently thereof.

Fixed on the spindle 1 adjacent the gear 16 is a gear 19, which may be directly coupled with the gear 16 by the means of a manually operable spring plunger 20, or may be uncoupled therefrom by withdrawing plunger 20, to the position shown in Fig. 2, the plunger being provided with a hand operable knob 21, and with suitable means for selectively retaining the plunger in disengaged position. Such coupling means being well known in a variety of forms will not be described in detail.

In the disengaged position of plunger 20, gear 19 may alternatively be driven through a gear 22 fixed on sleeve 18, and the gears 23, 24 fixed on a sleeve 25, and respectively meshing with the gears 22 and 19.

The sleeve 25 is rotatable on a shaft 26 having end portions 27, 28 eccentric to the axis of the shaft 26 and journaled in the headstock portions 5, 6. A handle 29 is fixed on the end portion 28, whereby the shaft 26 may be manually rotated to alternate positions determined by the eccentrics, respectively engaging and disengaging the gears 22, 23 and 19, 24. When plunger 20 is in the position coupling gears 16 and 19 directly together, the handle 29 is turned to a position disengaging the gears 22, 23 and 19, 24. The back gear arrangement, as described, constitutes a secondary rate change device serially arranged with the primary variator 10.

A carriage screw 30 is mounted for rotation, but fixed against axial movement at the front of bed 2, and may be alternatively engaged or disengaged by the movable elements 31, 32 of a nut generally denoted by the numeral 33, the elements connected for movement from a hand lever 34 connected therewith in any suitable well known manner.

Screw 30 is driven from spindle 1 by the means of a train of gears 35, 36, 37, and a feed rate changer of suitable form, in this instance including removable and replaceable gear pairs such as the gears 38, 39. Rate changers of this type being well known the feed rate changer will not be described in detail.

The primary variator 10 is of a construction more specifically shown and described in an application Serial No. 52,095, filed November 29, 1935, and therefore will not here be described in any considerable detail. The variator includes the drive shaft 11, a driving gear 40 fixed thereon, a driven gear 41 fixed on the driven shaft 12, and gears such as 42 fixed on shafts such as 43, there being several of the gears 42, preferably three, equi-angularly spaced and each simultaneously meshing with the driving gear 40 and driven gear 41. Shafts 43 and gears 42 are journaled in a cage rotatably mounted upon the driving shaft 11 and generally denoted by the numeral 44, the cage including a sleeve portion 44a and flange portions 44b and 44c fixed with the sleeve 44a and respectively carrying the bearings for the opposite ends of shafts 43, in this instance anti-friction bearings such as 47, 48.

Fixed with each of the shafts 43 are tapered friction rolls such as 49. The axes of the shafts 43 are angularly disposed with respect to the shaft 11, at an angle such that the outer periphery of each of the friction rolls 49 is parallel with the axis of shaft 11. Frictionally simultaneously engaging the peripheries of each of the rolls 49 is a friction ring 50 carried by a frame generally denoted by the numeral 51, the frame together with the ring 50 being adjustable in a path parallel with the axis of shaft 11, whereby to engage ring 50 with the rolls at points of different roll diameter, the frame being slidably guided for such movement by spaced members including a rod 52 and a screw 53, the frame providing a nut 54 engaging the threads of screw 53, the screw being rotatable by the means of a beveled gear 55 fixed on the end of the screw, a meshed beveled gear 56, a shaft 57 and a hand wheel 58, exposed at the front of the lathe in a position to be conveniently operated by the lathe operator. The ring 50 is prevented from rotation, and carried by frame 51 in a manner permitting of a certain amount of adjustment relative to the frame, whereby to simultaneously engage the periphery of each of the friction rolls 49 with equal pressure and in correct alignment, but since the details of the mounting of the ring do not concern the present invention, they will not be here described.

The friction contact between the rolls 49 and ring 50 forces each of the rolls 49 to revolve whenever cage 44 is revolved and at a relative speed determined in part by the diameter of the rolls at the point of ring contact, and in part by the diameter of roll 50 at the point where it contacts the rolls. As the ring 50 is adjusted axially it contacts the rolls 49 at points of differing roll diameter and changes the relative speed of the rolls. Thus as the ring is adjusted to the left in Fig. 3 the speed of the rolls 49 and gears 42 increases, and vice versa, and the relationship of the parts is such that when shaft 11 is driven at a given speed the variable speed of rolls 49 will enforce a variable speed on driven shaft 12. With the parts proportioned as shown the speed of the driven shaft 12 may be any speed from zero speed, obtained when the ring 50 is farthest to the left and rolls 49 are revolving at highest speed, to a maximum speed which is about one-fourth the speed of motor 9 and shaft 11, obtained in the right hand adjustment of ring 50, but various other ranges of the speed of shaft 12 may be readily obtained by the use of gearing and rolls differently proportioned to suit the desired speed range, and in any event any speed within the selected predetermined range may be obtained by intermediate adjustments of the ring 50.

The construction of the variator device 10 is such that the friction contacts between the ring 50 and rolls 49 each carry only a relatively small proportion of the torque load on the device. In part this is due to the plurality of rolls used for contacting the ring 50, and in part due to the relatively high linear speeds of the rolls at all speeds of the outpost shaft 12. For these and various other reasons relatively very heavy torques can be transmitted to be effective at a given diameter of a work piece carried by the spindle 1. In other words heavy cuts can be taken on work pieces supported from spindle 1, at relatively large diameters without slip between the friction contacts of the rolls 49 and ring 50 even when the back gears are not in use. For still larger work diameters, or heavier cuts, such as might otherwise cause slip between the friction surfaces, the back gear connection through the sleeve 18, gears 22, 23, sleeve 25 and gears 24, 19 is used, the back gear connection multiplying the torque available at the work piece substantially in the same proportion as the reduction ratio of the back gearing.

Means are provided to maintain suitable friction pressure between the rolls 49 and ring 50. For this purpose the bearings 47 and 48 of each of the shafts 43 are axially slidable for bodily axial movement of rolls 49 along their angular axes. Each of the rolls 49 is continuously urged to the left in Fig. 3 by the means of a yoke 59, slotted as at 60 to provide ears such as 61 engaging the end surface of a sleeve 62 which carries the bearing 47, the yoke 59 being continuously urged to the left, together with the sleeve 62, bearing 47 and roll 49, by the means of a spring 63, the pressure of the spring 63 being adjustable by the means of a spring abutment member 64 threaded on the hub 65. Forcing the rolls to the left maintains pressure between the roll periphery and the friction ring 50 by reason of the angular relationship of the axes of the shafts 43, and the pressure between the rolls 49 and ring 50 may be maintained at a preferred maximum, determined by the strength of the spring 63 and the adjustment of nut 64.

By reason of the range of the variator here shown to include zero speed of shaft 12 the range of spindle speeds starts at zero, both when the back gears are included in the spindle train, and when the spindle is driven to exclude the back gears. Thus there is a considerable range of spindle speeds, starting at zero speed in which any speed may be obtained either through the back gears or exclusive thereof according to torque requirements.

It is contemplated, however, that with the variator modified to alter the effective speed range thereof, as by modifying the size of the rolls and gearing as previously mentioned, the spindle speeds obtained exclusive of the back gears will constitute a high series of speeds, terminating in a lowest speed approximately the same as the highest speed of another series available through the back gears.

It will be noted that the unit 7 may readily be applied to any lathe having a suitable spindle, whereby to provide the advantages of a rate changer adjustable for any speed within its range. Also that removal and replacement of the unit 7 is greatly facilitated by the fact that the gear elements 16, 17 are connected and disconnected during the replacement and removal of the unit.

What is claimed is:

1. In a machine tool, the combination of a rotatable support, a drive shaft, a train for connecting said shaft and support and including two rate changers serially arranged, an alternative train for connecting said shaft and support through one of said rate changers to exclude the other, individual control means for adjusting each of said rate changers, and control means adjustable for alternative actuation of said support from the one or the other of said trains, said one of said rate changers including a variable speed output shaft, a differential connection between said drive shaft and output shaft including a toothed gear simultaneously rotatable on its own axis and bodily rotatable on another axis, and means for simultaneously adjusting the speed of rotation of said gear on each of said axes including frictionally engaged relatively adjustable elements, the associated individual control means being operative for the relative adjustment of said elements.

2. In a machine tool transmission and control, the combination of a rotatable support, a drive shaft, a train for connecting said shaft and support and including two rate changers serially arranged, an alternative train for connecting said shaft and support through one of said rate changers to exclude the other, said one of said rate changers including a toothed rotatable drive gear, a cage rotatable co-axially with said drive gear and independently thereof, a plurality of toothed angularly spaced gears each engaging said drive gear and each mounted for bodily rotation with said cage on the cage axis and for independent rotation on its own axis, friction means controlling the speed of rotation of said angularly spaced gears including a plurality of friction elements respectively associated with the different angularly spaced gears and a relatively adjustable friction member simultaneously engaging each of said elements, and control means for said transmission including means adjustable for said relative adjustment of said member, and means adjustable for alternative actuation of said support from the one or the other of said trains.

3. In a machine tool transmission and control, the combination of a rotatable support, a drive shaft, a train for connecting said shaft and support including two rate changers serially arranged, an alternative train for connecting said shaft and support through one of said rate changers to exclude the other, said one of said rate changers including a toothed rotatable drive gear, a cage rotatable co-axially with said drive gear and independently thereof, a plurality of similar conical friction rolls each mounted for bodily rotation with said cage on the cage axis and for independent rotation on its own axis, the axes of said rolls being angularly spaced and positioned for the roll peripheries to be tangent to a cylinder co-axial with said drive gear, an internal toothed gear co-axial with said drive gear, a plurality of toothed gears respectively fixed for rotation with different of said rolls and each simultaneously engaging said drive and internal gears, and a non-rotatable ring member co-axial with said drive gear and internally simultaneously frictionally engaging a portion of the periphery of each of said rolls, said ring being adjustable relative to said rolls in the direction of the axis of said drive gear, and control mechanism including means adjustable for said adjustment of said ring and other control means adjustable for alternative connection of said trains.

4. In a machine tool, the combination of a base, a rotatable spindle carried by said base, a plurality of spindle bearings carried by said base and axially spaced apart, a spindle drive gear carried by said spindle at a point spaced axially between said bearings, a unitary device removably and replaceably carried by said base including a rate changer for actuating said gear, said rate changer comprising frictionally engaged elements relatively adjustable for effecting a high speed, a relatively low speed, and any speed intermediate therebetween, and a motion transmitting train between said rate changer and said gear including elements disengageable during removal of said unitary device and reengageable during replacement thereof.

5. In a lathe the combination of a bed, a headstock portion fixed therewith, a carriage supported on said bed for horizontal movement toward and from said headstock, a plurality of spindle bearings spaced apart in said headstock and axially parallel with said carriage movement, a work spindle rotatably supported in said bearings having an end projecting outside said bearings in the direction of said carriage, a gear fixed on said spindle at a point between said bearings, a unitary device removably and replaceably supported from said bed and including a stepless rate changer providing frictionally engaged elements relatively adjustable for effecting a high speed, a relatively low speed and any speed intermediate therebetween, a motion transmitting train connecting said rate changer and gear including elements disengageable during removal of said unitary device and reengageable during replacement thereof, and a controller for adjustment of said frictionally engaged elements including a manually operable element positioned adjacent said projecting spindle end.

6. In a machine tool, the combination of a base, a spindle rotatably carried by said base, a unitary device removably and replaceably carried by said base including a driving motor and a stepless rate changer driven thereby, said rate changer comprising elements relatively adjustable for effecting a high speed, a relatively low speed and any speed intermediate therebetween, said unitary device including an output shaft for said rate changer, and gearing connecting said output shaft and spindle, said gearing including gears disengageable during removal of said unitary device and reengageable during replacement thereof.

HERMAN W. FALK.